United States Patent
Brissette et al.

(10) Patent No.: US 11,683,271 B1
(45) Date of Patent: Jun. 20, 2023

(54) DIFFERENTIAL PROCESSING OF PACKETS USING SERVICE FUNCTION INSTANCES IDENTIFIED BY SERVICE FUNCTION VALUES IN PACKETS

(71) Applicant: Cisco Technology, Inc., San Jose, CA (US)

(72) Inventors: Patrice Brissette, Gatineau (CA); Jiri Chaloupka, San Jose, CA (US); Yuri Tsier, Kanata (CA); Hadee Akhand, Ottawa (CA); Vijay Umakant Wagle, Berwyn, PA (US)

(73) Assignee: Cisco Technology, Inc., San Jose, CA (US)

( * ) Notice: Subject to any disclaimer, the term of this patent is extended or adjusted under 35 U.S.C. 154(b) by 68 days.

(21) Appl. No.: 17/200,828

(22) Filed: Mar. 13, 2021

Related U.S. Application Data (60) Provisional application No. 62/989,503, filed on Mar. 13, 2020.

(51) Int. Cl.
*H04L 45/745* (2022.01)
*H04L 12/46* (2006.01)

(52) U.S. Cl.
CPC ........ *H04L 45/745* (2013.01); *H04L 12/4633* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 10,367,734 B2 | 7/2019 | Bashandy et al. | |
| 10,469,367 B2 | 11/2019 | Filsfils et al. | |
| 10,601,724 B1 | 3/2020 | Filsfils et al. | |
| 10,841,220 B1 | 11/2020 | Filsfils et al. | |
| 2007/0058638 A1* | 3/2007 | Guichard | H04L 12/4641 370/395.31 |

(Continued)

OTHER PUBLICATIONS

"Virtual Access PPP Features in Cisco IOS," Oct. 22, 2018, Document ID: 14943, Cisco Systems, Inc., San Jose, CA (nine pages).

(Continued)

*Primary Examiner* — Christine T Duong
(74) *Attorney, Agent, or Firm* — Polsinelli (57) ABSTRACT

In one embodiment, associated differential processing of decapsulated packets is performed using Service Function Instances (SFIs) identified by Service Function Values (SFVs) derived from their encapsulating transport packets. By using different SFVs associated with different processing policies within a same processing context, one embodiment performs differential processing of streams of packets (arriving in transport packets) as identified by the particular SFV obtained from each particular transport packet. In other words, the processing policy identifies processing performed on the corresponding decapsulated original packet, not processing of the transport packet. Thus, if the original packet is an Internet Protocol (IP) packet, the SFI identifies Layer 3 processing that is performed on the original IP packet. Additionally, one embodiment uses a route advertising protocol (e.g., Border Gateway Protocol) to distribute associations between different SFVs and different addresses in a processing context (e.g., VRF).

17 Claims, 8 Drawing Sheets

**SFI and VRF (e.g., Original [IP] Packet FIB)
Identified Based on SFV**

(56) References Cited

U.S. PATENT DOCUMENTS

| | | | |
|---|---|---|---|
| 2009/0323698 A1* | 12/2009 | Le Faucheur | H04L 47/70 370/395.53 |
| 2020/0213154 A1* | 7/2020 | Han | H04L 47/125 |
| 2020/0344089 A1* | 10/2020 | Motwani | H04L 45/66 |
| 2020/0412846 A1 | 12/2020 | Filsfils et al. | |

OTHER PUBLICATIONS

"MPLS: Layer 3 VPNs Configuration Guide, Cisco IOS Release 15M&T," Mar. 15, 2013, Cisco Systems, Inc., San Jose, CA (330 pages).

"Data Center Top-of-Rack Architecture Design," 2009, White Paper, Cisco Systems, Inc., San Jose, CA (Thirteen pages).

"Cisco Programmable Fabric with VXLAN BGP EVPN Configuration Guide," Aug. 27, 2019, Cisco Systems, Inc., San Jose, CA (274 pages).

"VXLAN Interfaces," CLI Book 1: Cisco ASA Series General Operations CLI Configuration Guide, 9.4, Jun. 25, 2000, Cisco Systems, Inc., San Jose, CA (sixteen pages).

"Configure VXLAN," Mar. 25, 2000, Document ID: 118978, Cisco Systems, Inc., San Jose, CA (twelve pages).

Fox and Gleeson, "Virtual Private Networks Identifier," Sep. 1999, RFC 2685, The Internet Society, Reston, VA, USA (six pages).

Martini et al., "Encapsulation Methods for Transport of Ethernet over MPLS Networks," Apr. 2006, RFC 4448, The Internet Society, Reston, VA, USA (twenty-four pages).

Sajassi et al., "A Network Virtualization Overlay Solution Using Ethernet VPN (EVPN)," Mar. 2018, RFC 8365, The Internet Society, Reston, VA, USA (thirty-three pages).

Filsfils et al., "IPv6 Segment Routing Header (SRH)," Mar. 14, 2020, RFC 8754, The Internet Society, Reston, VA, USA (twenty-seven pages).

Sajassi et al., "Integrated Routing and Bridging in EVPN," Feb. 10, 2021, draft-ietf-bess-evpn-inter-subnet-forwarding-13. The Internet Society, Reston, VA, USA (thirty-five pages).

Boutros et al., "VXLAN DCI Using EVPN," Oct. 21, 2016, draft-boutros-bess-vxlan-evpn-02.txt, The Internet Society, Reston, VA, USA (fifteen pages).

Maino et al., "Generic Protocol Extension for VXLAN," Apr. 30, 2018, draft-ietf-nvo3-vxlan-gpe-06, The Internet Society, Reston, VA, USA (seventeen pages).

Filsfils et al., "Segment Routing Policy Architecture," Nov. 1, 2020, draft-ietf-spring-segment-routing-policy-09. The Internet Society, Reston, VA, USA (thirty-seven pages).

Filsfils et al., "SRv6 Network Programming," Dec. 29, 2020, draft-ietf-spring-srv6-network-programming-28, The Internet Society, Reston, VA, USA (forty-four pages).

Cheng et al., "Compressed SRv6 Segment List Encoding in SRH," Nov. 17, 2020, draft-filsfilscheng-spring-srv6-srh-comp-sl-enc-02, The Internet Society, Reston, VA, USA (thirteen pages).

Filsfils et al., "Network Programming extension: SRv6 uSID instruction," Feb. 19, 2021, draft-filsfils-spring-net-pgm-extension-srv6-usid-09, The Internet Society, Reston, VA, USA (twenty-two pages).

Saad et al., "Scalable Network Slicing over SR Networks," Feb. 22, 2021, draft-bestbar-spring-scalable-ns-01, The Internet Society, Reston, VA, USA (thirteen pages).

Saad et al., "Realizing Network Slices in IP/MPLS Networks," Feb. 22, 2021, draft-bestbar-teas-ns-packet-02, The Internet Society, Reston, VA, USA (twenty-eight pages).

Filsfils et al., "Stateless and Scalable Network Slice Identification for SRv6," Jan. 13, 2021, draft-filsfils-spring-srv6-stateless-slice-id-02, The Internet Society, Reston, VA, USA (five pages).

Saad et al., "IGP Extensions for SR Slice Aggregate SIDs," Feb. 22, 2021, draft-bestbar-lsr-spring-sa-00, The Internet Society, Reston, VA, USA (twelve pages).

* cited by examiner

Service Function Value (SFV) Mappings
FIGURE 3A

SFI and VRF (e.g., Original [IP] Packet FIB)
Identified Based on SFV

DIFFERENTIAL PROCESSING OF PACKETS USING SERVICE FUNCTION INSTANCES IDENTIFIED BY SERVICE FUNCTION VALUES IN PACKETS

CROSS-REFERENCE TO RELATED APPLICATIONS

This application claims priority to U.S. Provisional Application No. 62/989,503, filed Mar. 13, 2020, which is hereby incorporated by reference in its entirety.

TECHNICAL FIELD

The present disclosure relates generally to communicating and processing of packets in a network, including differential processing of original encapsulated packets by different Service Function Instances identified by corresponding Service Function Values (SFVs) included in transport packets encapsulating the original packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based on one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated differential processing of decapsulated packets using Service Function Instances (SFIs) identified by Service Function Values (SFVs) derived from their encapsulating transport packets.

By using different SFVs associated with different processing policies within a same processing context, one embodiment performs differential processing of streams of packets (arriving in transport packets) as identified by the particular SFV obtained from each particular transport packet. In other words, the processing policy identifies processing performed on the corresponding decapsulated original packet, not processing of the transport packet. Thus, if the original packet is an Internet Protocol (IP) packet, the SFI identifies Layer 3 processing that is performed on the original IP packet.

Virtual Route Forward (VRF) is a technique used to process multiple virtual networks within a single network entity. In a single network component, multiple VRF resources create the isolation between virtual networks. In one embodiment, each VRF is associated with multiple SFVs (e.g., MPLS VPN labels, VNIs, 802.1Q VLAN tags) from which a network node identifies both the particular VRF and a particular Service Function Instance (e.g., processing policy to be applied to the original packet). The particular VRF includes a Forwarding Information Base (FIB) on which lookup operations can be performed (e.g., based on the IP Destination Address of an IP packet). In one embodiment, each Service Function Instance is implemented using a different virtual interface of a network node.

Additionally, one embodiment uses a route advertising protocol (e.g., Border Gateway Protocol) to distribute associations between different SFVs and different addresses in a processing context (e.g., VRF). Having received advertisements of multiple different SFVs (e.g., MPLS VPN labels, VNI) for a same processing context, an ingress router selects the corresponding SFV for a received original packet (e.g., the selected SFV is a FIB lookup result in the ingress router), and generates and sends a transport packet including the selected SFV and original packet into the network. Based on the selected SFV included in the transport packet, a receiving node identifies the processing context and therein a particular processing policy (SFI), and applies the particular processing policy (in the processing context) to the original packet (e.g., after decapsulation).

2. Description

Disclosed are, inter alia, methods, apparatus, computer-storage media, mechanisms, and means associated differential processing of decapsulated original packets according to Service Function Instances (SFIs) identified by Service Function Values (SFVs) derived from their encapsulating transport packets.

As used herein, a Service Function Value (SFV) is a value (e.g., label, address, hierarchical value, non-hierarchical or opaque value) obtained from a transport packet (typically in its header, but possibly based fields from the encapsulated packet. In one embodiment, an SFV is a Multiprotocol Label Switching (MPLS) Virtual Private Network (VPN) label. In one embodiment, an SFV is a Virtual Extensible LAN (VxLAN) network identifier (VNI).

A SFV identifies to a network node both a particular processing context (e.g., a particular Virtual Routing and Forwarding (VRF)) and a particular processing policy (e.g., a particular Service Function Instance (SFI)) within the particular processing context for processing the original packet (e.g., the encapsulated packet carried in the transport packet). As used herein (including obvious variants of these terms), an "original packet" refers to the packet that encapsulated in, transported in, and decapsulated from a "transport packet" or "encapsulating packet."

By using different SFVs associated with different processing policies within a same processing context, one embodiment performs differential processing of streams of packets (arriving in transport packets) as identified by the particular SFV obtained from each particular transport packet. In other words, the processing policy identifies processing performed on the corresponding decapsulated original packet, not processing of the transport packet. Thus, if the original packet is an Internet Protocol (IP) packet, the SFI identifies Layer 3 processing that is performed on the original IP packet.

Virtual Route Forward (VRF) is a technique used to process multiple virtual networks within a single network entity. In a single network component, multiple VRF resources create the isolation between virtual networks. In one embodiment, each VRF is associated with multiple SFVs (e.g., MPLS VPN labels, VNIs, 802.1Q VLAN tags) from which a network node identifies both the particular VRF and a particular Service Function Instance (e.g., processing policy to be applied to the original packet). The particular VRF includes a Forwarding Information Base (FIB) on which lookup operations can be performed (e.g., based on the IP Destination Address of an IP packet). In one embodiment, each Service Function Instance is implemented using a different virtual interface of a network node.

Additionally, one embodiment uses a route advertising protocol (e.g., Border Gateway Protocol) to distribute associations between different SFVs and different addresses in a processing context (e.g., VRF). Having received advertisements of multiple different SFVs (e.g., MPLS VPN labels, VNI) for a same processing context, an ingress router selects the corresponding SFV for a received original packet (e.g., the selected SFV is a FIB lookup result in the ingress router), and generates and sends a transport packet including the selected SFV and original packet into the network. Based on the selected SFV included in the transport packet, a receiving node identifies the processing context and therein a particular processing policy (SFI), and applies the particular processing policy (in the processing context) to the original packet (e.g., after decapsulation).

The terms "node" and "network node" are used herein to refer to a router or host. The term "route" is used herein to refer to a fully or partially expanded prefix/route (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time. The term "interface," expansively used herein, includes the interface infrastructure (e.g., buffers, memory locations, forwarding and/or other data structures, processing instructions) that is used by a network node in performing processing related to packets. Further, as used herein, a "virtual interface," in contrast to a "physical interface," is an interface that does not directly connect to an external cable or other communications mechanism.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1A:
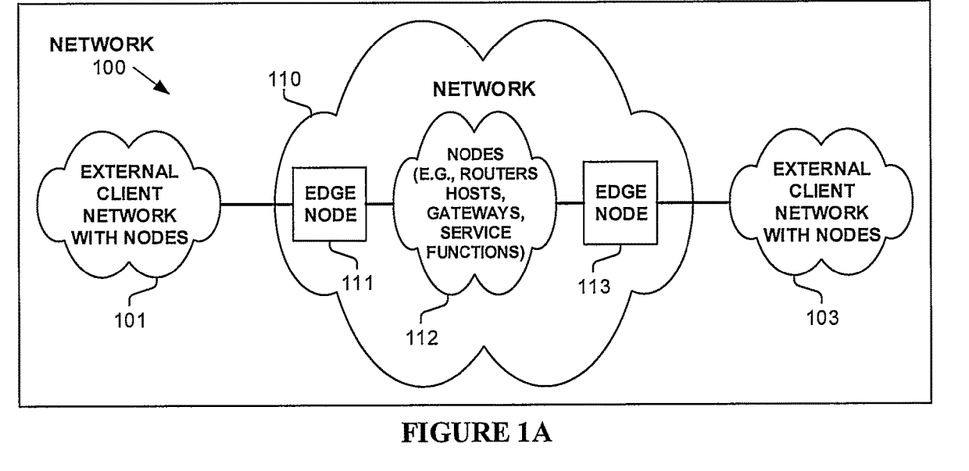
FIG. 1A illustrates a network operating according to one embodiment.

FIG. 1A illustrates a network 100 (e.g., an aggregation of one or more networks of one or more different entities) operating according to one embodiment. As shown, network 100 includes client networks 101 and 103 (which are the same network in one embodiment) communicatively coupled to provider network 110. In one embodiment, each of client networks 101 and 103 include hosts (e.g., end nodes) with upper-layer applications that communicate via network 100. In one embodiment, network 110 (e.g., a provider network) includes edge nodes 111 and 113, and a network 112 of network nodes including routers and hosts (e.g., end nodes). In one embodiment, edge nodes 111 and 113 process original packets received from networks 101 and 103, which typically includes generating transport packets including the received original packets (e.g., via encapsulation (e.g., adding one or more headers, including the original packet in the payload of a transport packet). The transport packets are forwarded and otherwise processed within network 110, typically resulting in the original packet being sent from network 110 to a client network 101, 103.

Figure 1B:
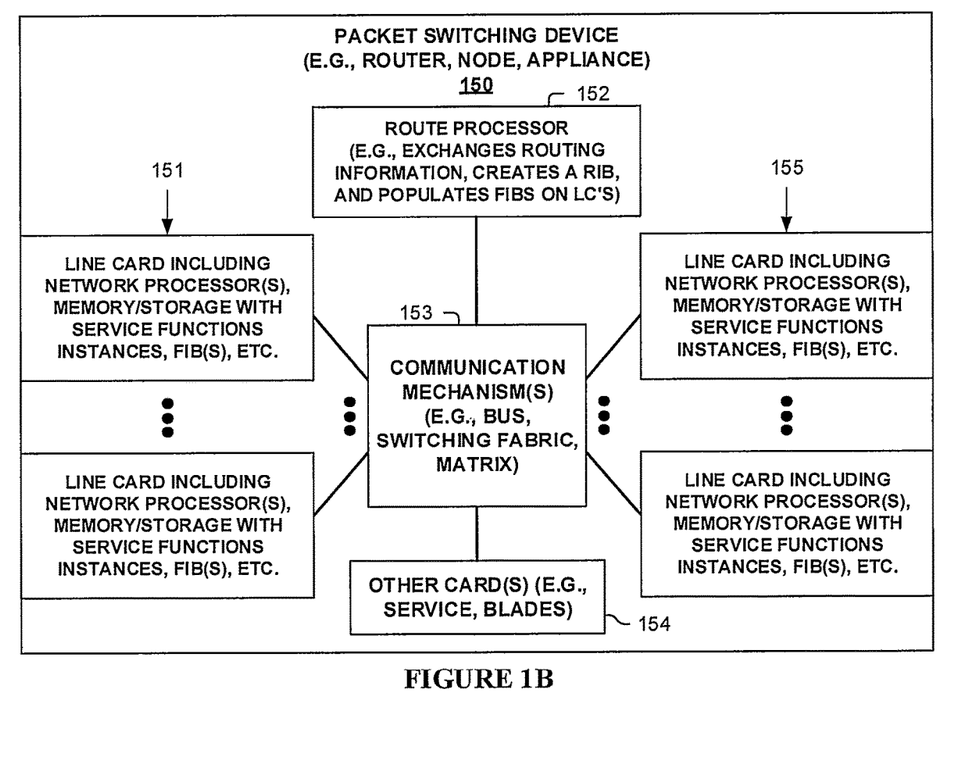
FIG. 1B illustrates a packet switching device according to one embodiment.
Figure 1C:
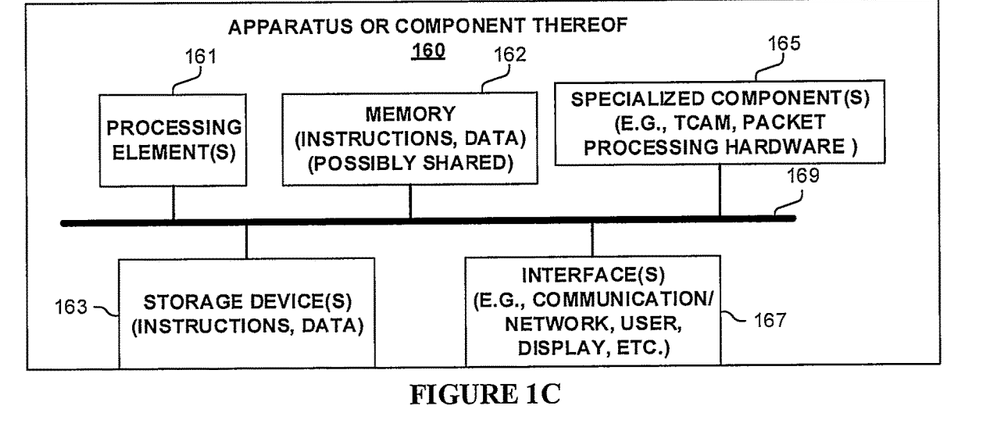
FIG. 1C illustrates an apparatus according to one embodiment.

FIGS. 1B-C and their discussion herein provide a description of various network nodes according to one embodiment.

FIG. 1B illustrates one embodiment of a packet switching device 150 (e.g., router, node, appliance, gateway) according to one embodiment. As shown, packet switching device 150 includes multiple line cards 151 and 155, each with one or more network interfaces for sending and receiving packets over communications links (e.g., possibly part of a link aggregation group), and with one or more processing elements that are used in one embodiment associated differential processing of decapsulated original packets according to Service Function Instances (SFIs) identified by Service Function Values (SFVs) derived from their encapsulating transport packets. Packet switching device 150 also has a control plane with one or more processing elements (e.g., Route Processor(s)) 152 for managing the control plane and/or control plane processing of packets associated differential processing of decapsulated original packets according to Service Function Instances (SFIs) identified by Service Function Values (SFVs) derived from their encapsulating transport packets. Packet switching device 150 also includes other cards 154 (e.g., service cards, blades) which include processing elements that are used in one embodiment to process (e.g., forward/send, drop, manipulate, change, modify, receive, create, duplicate, possibly operating in conjunction with shared memory and/or with one or more service functions, apply a service according to one or more service functions) associated differential processing of decapsulated original packets according to Service Function Instances (SFIs) identified by Service Function Values (SFVs) derived from their encapsulating transport packets, and some hardware-based communication mechanism 153 (e.g., bus, switching fabric, and/or matrix, etc.) for allowing its different entities 151, 152, 154 and 155 to communicate. Line cards 151 and 155 typically perform the actions of being both an ingress and egress line card, in regards to multiple other particular packets and/or packet streams being received by, or sent from, packet switching device 150. In one embodiment, virtual interfaces and packet processing functions (e.g., according to a SFV) are implemented on line cards 151, 155.

FIG. 1C is a block diagram of an apparatus 160 (e.g., host, router, node, destination, or portion thereof) used in one embodiment associated differential processing of decapsulated original packets according to Service Function Instances (SFIs) identified by Service Function Values (SFVs) derived from their encapsulating transport packets.

In one embodiment, apparatus 160 performs one or more processes, or portions thereof, corresponding to one of the flow diagrams illustrated or otherwise described herein, and/or illustrated in another diagram or otherwise described herein.

In one embodiment, apparatus 160 includes one or more processor(s) 161 (typically with on-chip memory), memory 162 (possibly shared memory), storage device(s) 163, specialized component(s) 165 (e.g. optimized hardware such as for performing lookup, packet processing (including processing identified by a SFV) and/or service function operations; associative memory; binary and/or ternary content-addressable memory; Application Specific Integrated Circuit(s), cryptographic hash hardware, etc.), and interface(s) 167 for communicating information (e.g., sending and receiving packets, user-interfaces, displaying information, etc.), which are typically communicatively coupled via one or more communications mechanisms 169 (e.g., bus, links, switching fabric, matrix), with the communications paths typically tailored to meet the needs of a particular application.

Various embodiments of apparatus 160 may include more or fewer elements. The operation of apparatus 160 is typically controlled by processor(s) 161 using memory 162 and storage device(s) 163 to perform one or more tasks or processes. Memory 162 is one type of computer-readable/computer-storage medium, and typically comprises random access memory (RAM), read only memory (ROM), flash memory, integrated circuits, and/or other memory components. Memory 162 typically stores computer-executable instructions to be executed by processor(s) 161 and/or data which is manipulated by processor(s) 161 for implementing functionality in accordance with an embodiment. Storage device(s) 163 are another type of computer-readable medium, and typically comprise solid state storage media, disk drives, diskettes, networked services, tape drives, and other storage devices. Storage device(s) 163 typically store computer-executable instructions to be executed by processor(s) 161 and/or data which is manipulated by processor(s) 161 for implementing functionality in accordance with an embodiment.

Figure 2A:
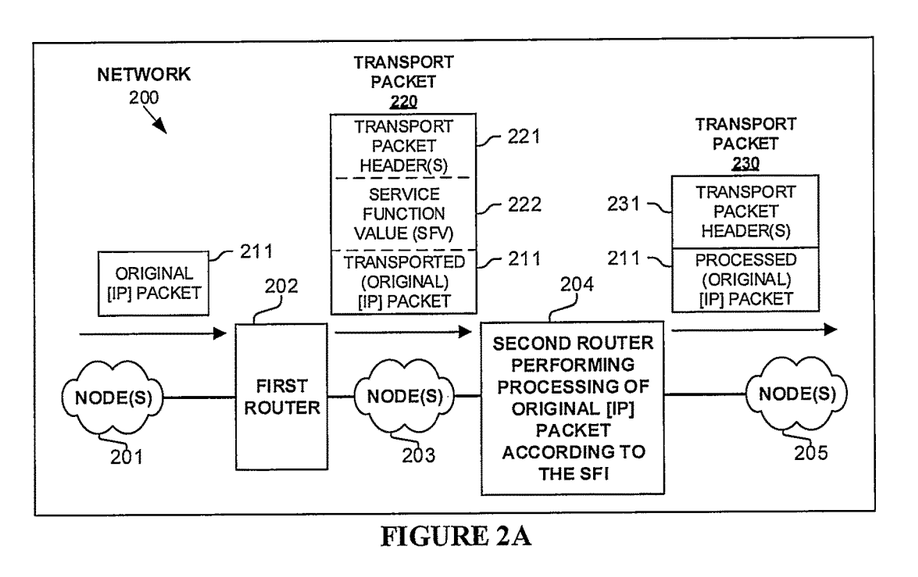
FIG. 2A illustrates a network operating according to one embodiment.

FIG. 2A illustrates an operation of network 200 according to one embodiment, such as, but not limited to, in a provider or.other network. As shown, network 200 includes node(s)

201 (e.g., typically including a source node of original packet 211), first router 202 and second router 204, with zero or more intervening nodes 203.

As depicted, original packet 211 (e.g., an IP packet) is received by first router 202. In response to classifying (or otherwise processing) received original packet 211, first router 211 generates transport packet 220 including header(s) 221 (e.g., including network transport information for reaching second router 204), corresponding particular SFV 222 (located according to one embodiment), and original packet 211. In one embodiment, SFV 222 is included in a transport packet header 221 (e.g., a VPN label, VNI). First router 202 sends transport packet 203 into network 200 towards second router 204. SFI 222 will vary among different subsets of packet streams of a same (and different) processing context in order to signal to second router 204 corresponding processing to be performed on original packet 211. In one embodiment, a nexthop router (203) to second router 204 performs MPLS penultimate hop popping (PHP), such that packet 220 received by second router 204 does not include any transport labels.

In response to receiving transport packet 220, second router 204 performs a lookup operation in a on SFV 222, resulting in the identification of a corresponding VRF and SFI. Original packet 221 is decapsulated and processed according to this SFI. If the packet is not dropped (e.g., per QoS or security SFI processing) or redirected (e.g., per Service Policy or Access-List Based Forwarding SFI processing), a forwarding lookup operation is performed on the FIB of the VRF, resulting in the identification of forwarding information. In one embodiment, the SFI-processed original packet 211 is encapsulated in another transport packet 230 (of a same or different transport protocol) including header(s) 231, and sent from second router 204 into network 200 (e.g., towards nodes 205). In one embodiment, SFV 222, relevant locally to second router 204, was encoded as a VPN label or VNI, with header 231 of transport packet 230 including an VPN label or VNI that will be used by a downstream router.

Figure 2B:
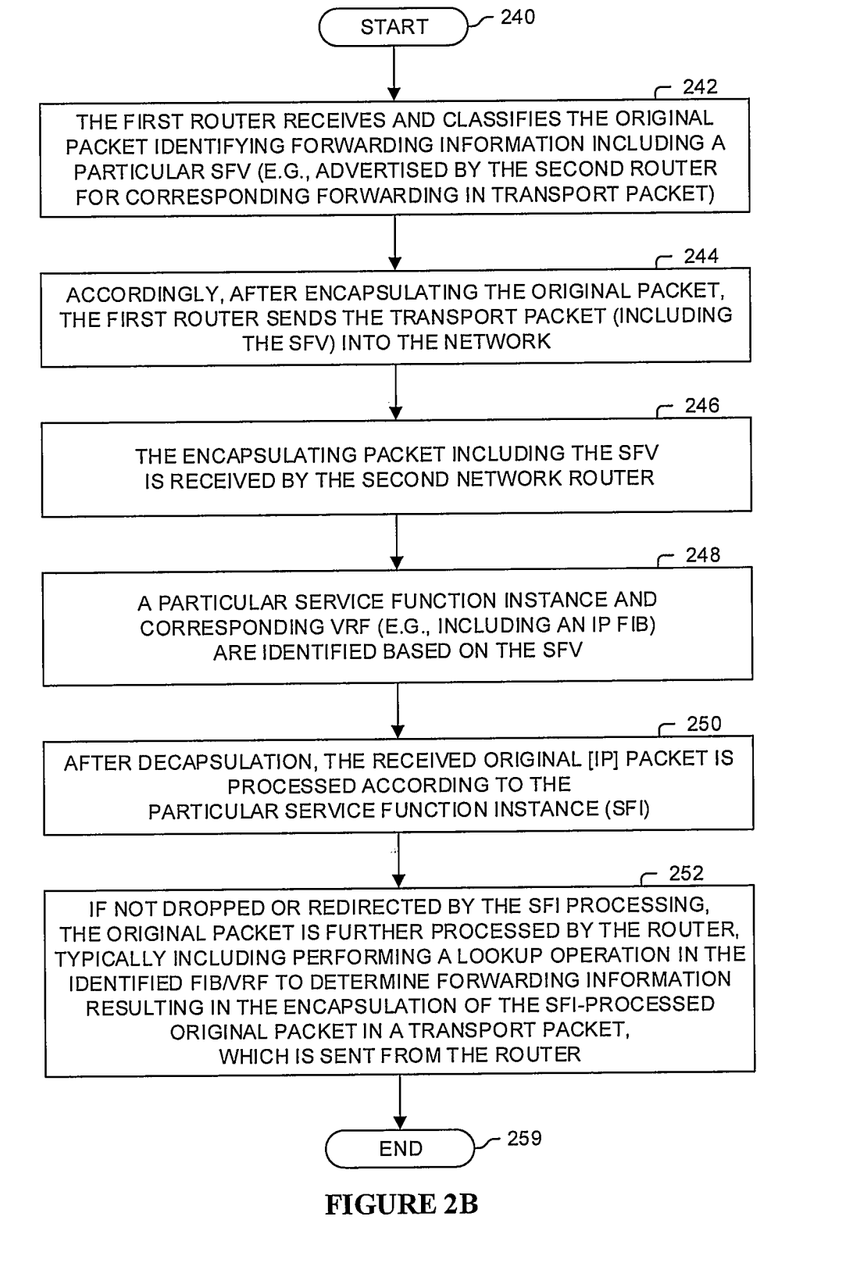
FIG. 2B illustrates a process according to one embodiment.

FIG. 2B illustrates processing performed, in one embodiment, a first network node and by a second network node in a network. Processing begins with processing block 240. In processing block 242, the first router receives and classifies the original packet identifying forwarding information including a particular SFV (e.g., advertised by the second router). Accordingly, in processing block 244, after encapsulating the original packet, the first router sends the transport packet (including the SFV) into the network.

In processing block 246, the encapsulating packet including the SFV and original packet is received by the second network router. In processing block 248, a particular SFI and corresponding VRF (e.g., including an IP FIB) are identified based on the SFV. In one embodiment, a lookup operation is performed based on the SFV in a forwarding data structure (e.g., FIB, LFIB) of the VRF, resulting in the identification of the particular SFI for processing the original packet.

In one embodiment, each service function instance is a virtual interface of the router, with each of these virtual interfaces represented by a value in the forwarding data structure (e.g., in a leaf node, in result memory). In one embodiment (e.g., using VxLAN), each Service Function Instance is implemented as a different Network Virtual Interface (NVE) of the router. Therefore in one embodiment, the lookup operation identifies a particular virtual interface, and in response, the original packet (and possibly the VRF and other values such as, but not limited to, in metadata or an internal packet header) is communicated to the particular virtual interface.

In processing block 250, after decapsulation, the received original [IP] packet is processed according to the particular SFI. In processing block 252, if the original packet is not dropped or redirected by the SFI processing, the original packet is further processed by the router, typically including performing a lookup operation in the identified FIB/VRF to determine forwarding information resulting in the encapsulation of the SFI-processed original packet in a new transport packet, which is sent from the router into the network on a forwarding path to a next node. Processing of the flow diagram of FIG. 2B is complete as indicated by processing block 259.

Figure 3A:
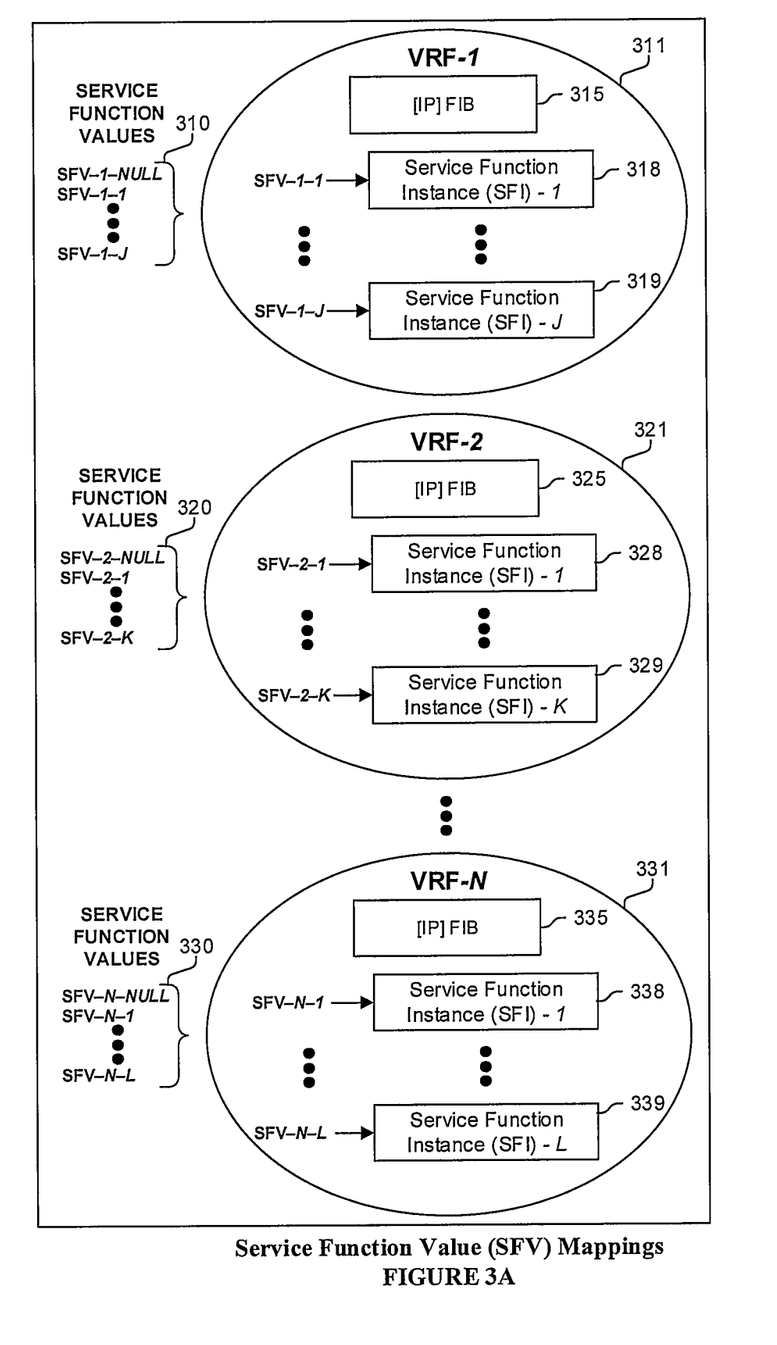
FIG. 3A illustrates relationships of among Service Function Values (SFVs), Service Function Instances (SFIs), Virtual Routing and Forwardings (VRFs), and Forwarding Information Bases (FIBs) according to one embodiment.

FIG. 3A illustrates a logical view of relationships between Service Function Values (SFVs) and Service Function Instances of corresponding VRFs.

Service Function Values 310 are related to SFIs 318-319 of VRF-1 (311). In particular:
- SFV-1-NULL does not identify a SFI, but identifies VRF-1 (311); and
- SFV-1-1 to SFV-1-J corresponding identify SFI-1 (318) to SFI-J (319) of VRF-1 (311).

Service Function Values 320 are related to SFIs 328-329 of VRF-1 (321). In particular:
- SFV-2-NULL does not identify a SFI, but identifies VRF-2 (321); and
- SFV-2-1 to SFV-1-K corresponding identify SFI-1 (328) to SFI-K (329) of VRF-2 (321).

Service Function Values 330 are related to SFIs 338-339 of VRF-1 (331). In particular:
- SFV-1-NULL does not identify a SFI but identifies VRF-3 (331); and
- SFV-3-1 to SFV-1-L corresponding identify SFI-1 (338) to SFI-J (339) of VRF-1 (331).

In one embodiment, more than one SFV associated with a same VRF identifies a same Service Function Instance within the same VRF. In one embodiment, the SFV with a value of NULL causes decapsulation of the original packet with a forwarding lookup operation performed in the corresponding FIB (315, 325, 335)/VRF (311, 321, 331).

In one embodiment, a SFV is a Multiprotocol Label Switching (MPLS) label. In one embodiment, a SFV is an MPLS Virtual Private Network (VPN) label. In one embodiment, a SFV is a Segment Identifier (e.g., label, IPv4 or IPv6 address), such as, but not limited to, identifying a Segment Routing End Function. In one embodiment, a SFV is an 802.1Q VLAN tag. In one embodiment, the SFV is a Destination Address of an IP packet. In one embodiment, the SFV is a combination of Source and Destination Addresses of an IP packet.

In one embodiment and for a particular VRF, there is one SFV/SFI per subnet. In one embodiment and for a particular VRF, there is one SFV/SFI per Customer Edge (CE). In one embodiment and for a particular VRF, there is one SFV/SFI per host. In one embodiment and for a particular VRF, there is one SFV/SFI per prefix.

In one embodiment (as illustrated in FIG. 3A), the second router identifies, based on the SFV, a processing context for the packet and performs (or causes to be performed by a communicatively coupled service function appliance) corresponding service processing of the transported (e.g., encapsulated) packet. In one embodiment, each SFV identifies both a corresponding VRF (e.g., processing context), and a Service Function Instance (e.g., a virtual interface)

defining processing to be performed (e.g., within the corresponding VRF) in relation to the original packet.

Figure 3B:
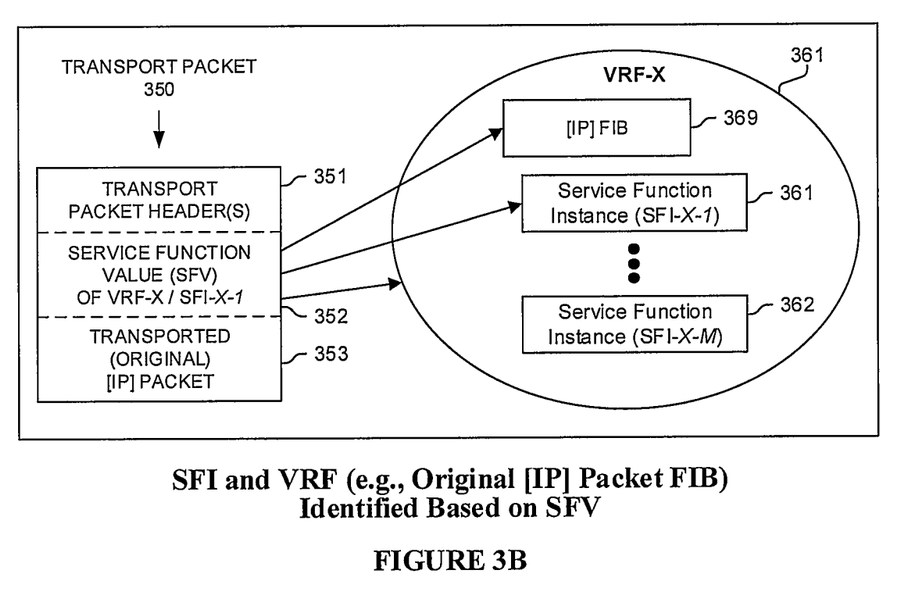
FIG. 3B illustrates a mappings of an SFV to a corresponding VRF, and SFI and FIB of the VRF according to one embodiment.

In one embodiment (as illustrated in FIG. 3B), SFV 352 maps to SFI 361 (of SFIs 361-362), FIB 369, and VRF 361. In one embodiment, the second router, based on SFV 352, performs (or causes to be performed by a communicatively coupled service function appliance) corresponding service processing according to identified SFI 361 of original packet 353 received in transport packet 350 with header(s) 351. In one embodiment, each SFV identifies a Service Function Instance (defining the corresponding processing to be performed on the original packet) within a corresponding VRF identified via another manner (e.g., another value in the received packet, inherent based on the received interface or address of the received interface).

In one embodiment, the Service Function Instance processing performed on/for the original packet includes one or more operations, comprising, but are not limited to the following listed operations.

Ingress packet processing.
Egress packet processing.
Quality of Service (QoS) processing.
Service Policy or Access-List Based Forwarding (BF).
Statistics updates, including flow and physical/virtual interface statistics.
Netflow statistics.
SNMP/Yang.
OAM and/or performance processing.
Security processing.
Packet forwarding.
Deep packet inspection (DPI).
Network Address Translation (NAT).
Load Balancing.
Firewall.
TCP optimization.
Packet forwarding differentiation (e.g., high/low priority).
Bandwidth management and use limitations.
Lawful intercept.
Local packet transport services (LPTS).
Service level agreement (SLA) compliance.
Virtual circuit connectivity verification (VCCV).
Traffic steering for groups of one or more packet flows.

After processing is performed related to the original packet according to the particular Service Function Instance (SFI), the router typically then further processes the original packet. In one embodiment, this further processing includes performing a lookup operation on the IP Destination Address of the original packet to determine forwarding information. Responsive to the forwarding information in one embodiment, the second router encapsulates the original packet and sends the encapsulated original packet into the provider network. In one embodiment, this encapsulation is according to the same protocol as that of the received transport packet. In one embodiment, this encapsulation is according to a different protocol than that of the received transport packet.

In one embodiment, this further processing includes performing a lookup operation on the IP Destination Address of the original packet to determine forwarding information. Responsive to the forwarding information in one embodiment, the second router sends the original packet (e.g., not encapsulated) into the provider network or to a client network.

Figure 3C:
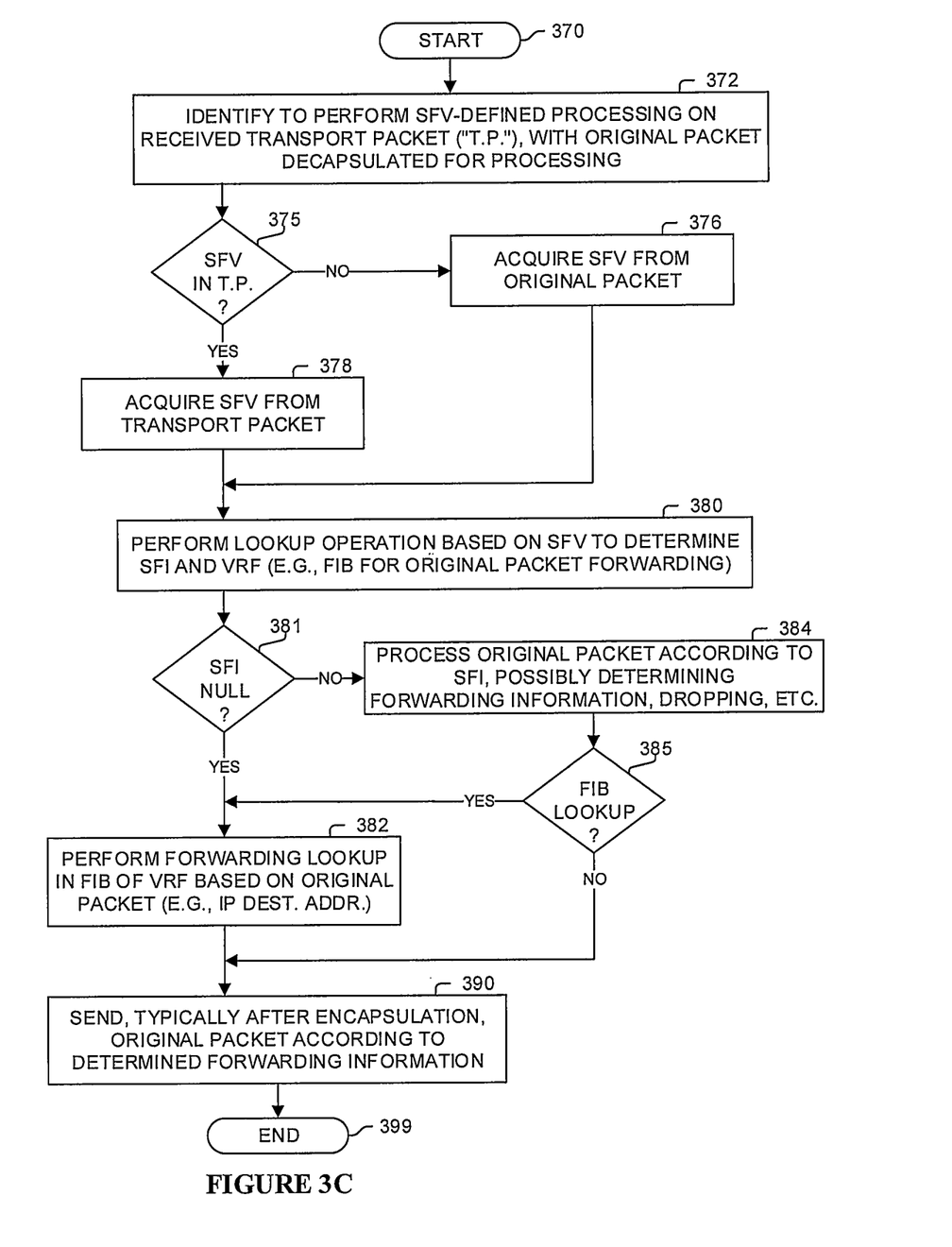
FIG. 3C illustrates a process according to one embodiment.

FIG. 3C illustrates a process performed in one embodiment. Processing block with processing block 370. In processing block 372, a network node identifies to perform SFV/SFI-defined processing on received transport packet ("T.P."), with original packet decapsulated for processing.

As determined in processing block 375, if there is a SFV in a field of the transport packet, the SFV is acquired from the transport packet. Otherwise, in processing block 376, the SFV is acquired based on one or more fields of the original packet. Continuing in processing block 380, a lookup operation is performed based on the SFV to determine the SFI and VRV (that includes the FIB for acquiring additional forwarding information for the original packet). As determined in processing block 381, if the SFI not NULL, thein the original packet is processed by the SFI (possibly resulting in redirection or dropping of the original packet). If the original packet is not dropped, processing continues to processing block 385. As determined in processing block 385, if a FIB lookup should be performed (e.g., the original packet is not be redirected by the SFI), then processing proceeds to processing block 382; otherwise processing proceeds directly to processing block 390.

Continuing in processing block 382, a lookup operation is performed in the FIB for the original packet resulting in forwarding information. Continuing in processing block 390, the original packet, typically after encapsulation, is sent from the router according to the forwarding information acquired in processing block 382 or 384. Processing of the flow diagram of FIG. 3C is complete as indicated by processing block 399.

Figure 4:
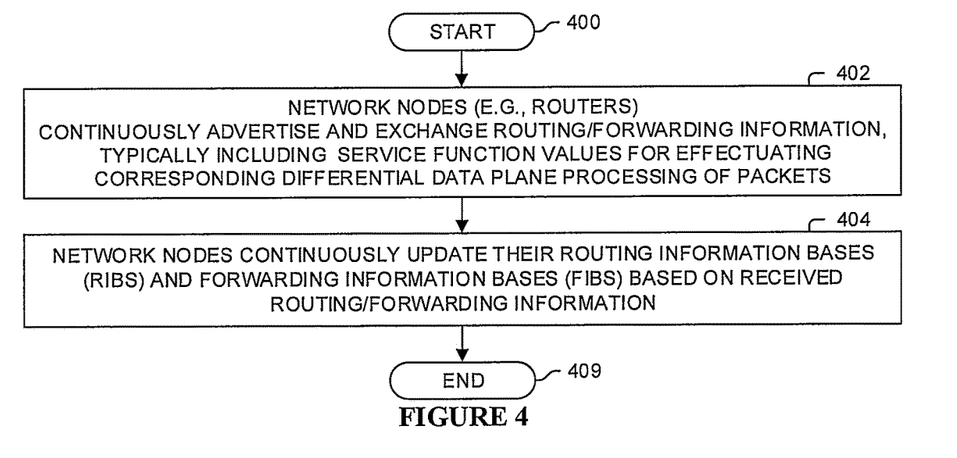
FIG. 4 illustrates a process according to one embodiment.

FIG. 4 illustrates a process according to one embodiment associated with differential processing of packets using instances of service functions identified by Service Function Values in transport packets. Processing begins with process block 400. In process block 302, nodes (e.g., routers) in the provider (or other) network continuously advertise and exchange routing/forwarding information typically via one or more routing protocols and/or other protocols. This information includes associations between addresses (e.g., IP Destination Addresses) and forwarding information including a corresponding SFV and transport information to a router in the network that will perform processing related to the original packet based on the SFV. In one embodiment, Border Gateway Protocol (BGP) is used to communicate the SFV (e.g., MPLS VPN label) advertised by a node to the encapsulating node. In process block 404, network nodes continuously update their routing/forwarding information as required (e.g., based on information received via a routing or other protocol, from a network management system, etc.). Processing of the flow diagram of FIG. 4 is complete as indicated by process block 329.

In one embodiment, a SFV is an MPLS VPN label used in identifying a corresponding VRF (e.g., processing context) and Service Function Instance (e.g., defining the processing to be performed in relation to the original packet).

Figure 5A:
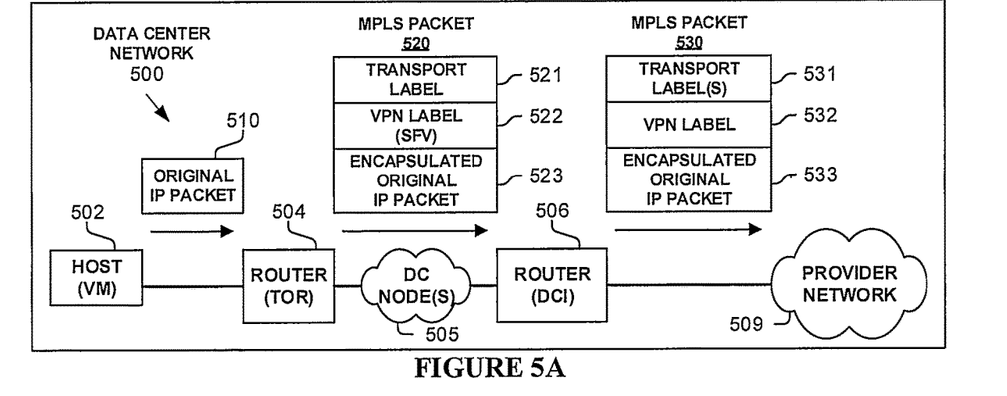
FIG. 5A illustrates a network operating according to one embodiment.

FIG. 5A illustrates network 500 operating according to one embodiment. As shown, a host 502 in the data center generates the original IP packet 510, which is sent to the top-of-rack (TOR) router 504. TOR router 504 classifies packet 510 to determine forwarding information to the data center interconnect (DCI) router 506 and a corresponding SFV 522 (an MPLS VPN label in one embodiment). The TOR router 504 encapsulates the original packet 510, and sends (into the data center network) the resultant MPLS packet 520 with the MPLS transport label 521 and VPN label (SFV) 522. In one embodiment, a nexthop router to the DCI router 506 performs MPLS penultimate hop popping (PHP) removing the transport label from the transport packet.

The DCI router 506 receives the MPLS packet 520, and identifies the corresponding VRF based on the VPN label/ SFI 522. The DCI router 506 then performs a lookup operation in the VRF based on the VPN label/SFI 522 to identify the corresponding Service Function Instance (e.g., instantiated as a virtual interface of the DCI router 506). The original packet 523 is decapsulated and processing is performed according to the Service Function Instance (e.g., according to the virtual interface identified by the ingress operation). In one embodiment, the processing according to the Service Function Instance includes determining forwarding information for the processed original packet (e.g., Service Policy or Access-List Based Forwarding (BF)).

In one embodiment, subsequent to the processing according to the Service Function Instance, the DCI router 506 classifies the processed original packet 533 to determine forwarding information for the processed original packet (e.g., if not already acquired by the Service Function Instance/virtual interface).

In one embodiment, the forwarding information for the (Service Function Instance processed) original packet identifies MPLS encapsulation. Accordingly, the DCI router 506 encapsulates the processed original packet 522 and sends it from the data center network.

In one embodiment, this MPLS packet 530 includes a specific VPN label 532 identifying the VRF. In one embodiment, this specific VPN label 532 is the same VPN label (the SFV) 522 of the received MPLS packet 520. In one embodiment, this specific VPN label 532 is a different VPN label identifying the VRF, such as a same label used in all outgoing MPLS packets of the VRF. In one embodiment, this different VPN label 532 is a new SFV of the VRF used to identify a Service Function Instance of a downstream node.

Figure 5B:
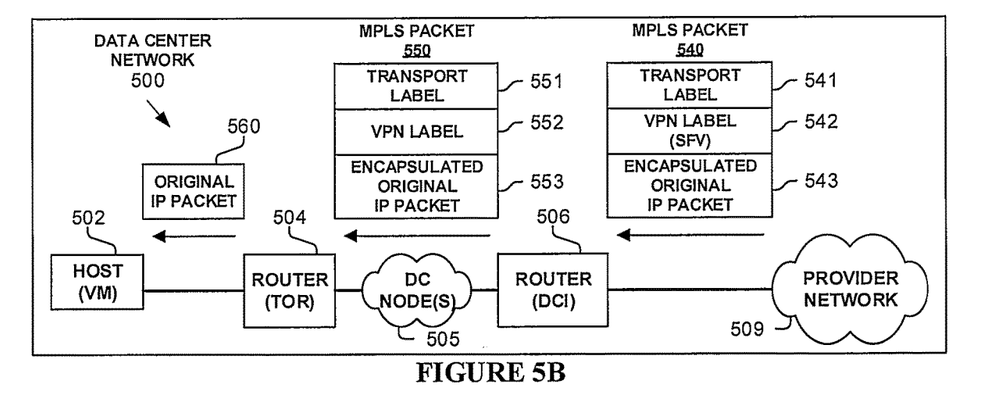
FIG. 5B illustrates a network operating according to one embodiment.

FIG. 5B illustrates network 500 operating according to one embodiment. As shown, the DCI router 506 receives the MPLS transport packet 540 including a transport label 541, VPN label (the SFV) 542, and original packet 543 encapsulated therein. In one embodiment, a nexthop router to the DCI router 506 performs MPLS penultimate hop popping (PHP) removing the transport label from the transport packet before sending it to the DCI router.

The DCI router 506 receives the MPLS packet 540, and identifies the corresponding VRF based on the VPN label 532. The DCI router 506 then performs a lookup operation in a data structure of the VRF based on the VPN label 532 to identify the corresponding Service Function Instance (e.g., instantiated as a virtual interface of the DCI router). The original packet 533 is decapsulated and processed according to the Service Function Instance. In one embodiment, subsequent to the processing according to the Service Function Instance, the DCI router 506 classifies the processed original packet 553 to determine forwarding information for the processed original packet 553. In one embodiment, the processing according to the Service Function Instance includes determining forwarding information for the processed original packet 553. As shown and in one embodiment, the original packet 553 is encapsulated as an MPLS packet 550 and send from the DCI router 506 into the data center towards its destination with original packet 560 (decapsulated by router 504) being received by host 502.

In one embodiment, this MPLS packet 550 includes a specific VPN label 552 identifying the VRF. In one embodiment, this specific VPN label 552 is the same VPN label (the SFV) 542 of the received MPLS packet 540. In one embodiment, this specific VPN label 552 is a different VPN label identifying the VRF, such as a same label used in all outgoing MPLS packets of the VRF. In one embodiment, this different VPN label 552 is a new SFV of the VRF used to identify a Service Function Instance of a downstream node.

Figure 6:
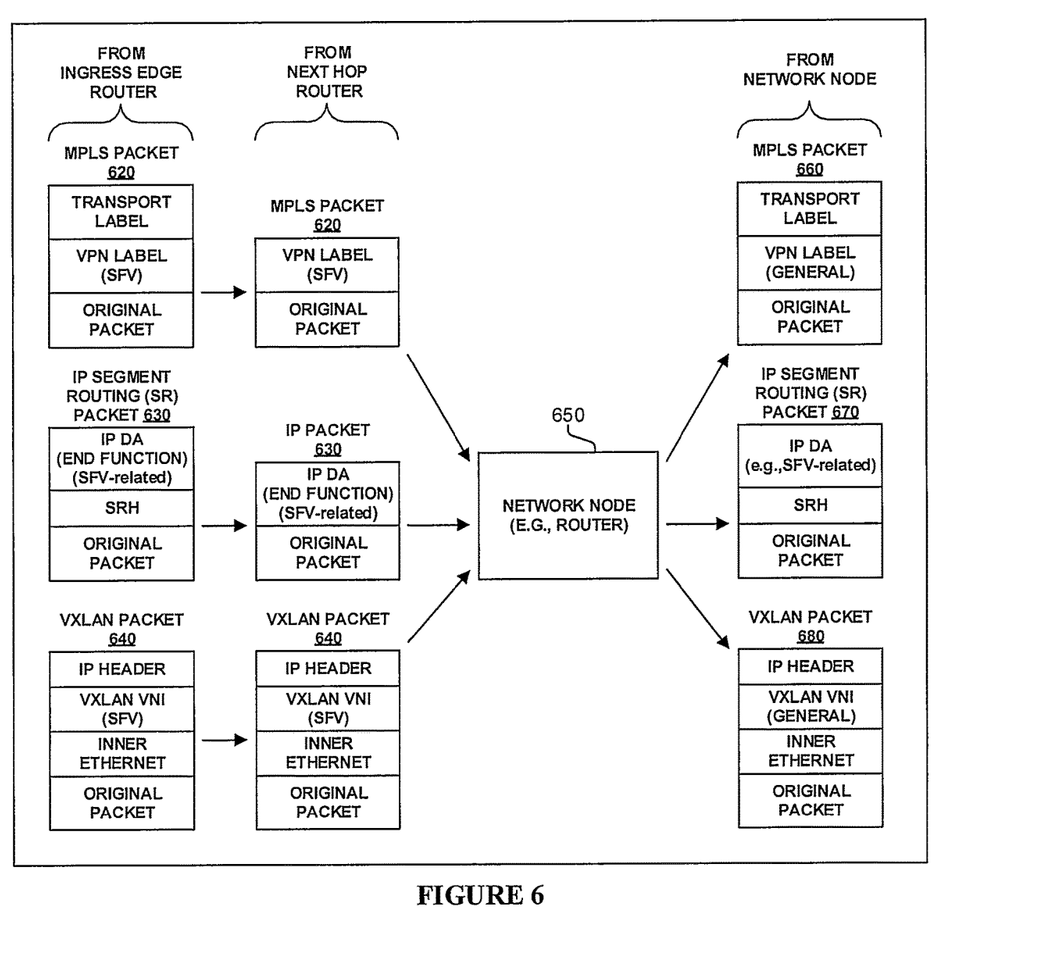
FIG. 6 illustrates processing of packets according to one embodiment.

FIG. 6 illustrates that the use of Service Function Values and corresponding differential processing by corresponding Service Function Instances (e.g., virtual interfaces in one embodiment) is not limited to a single protocol. Although much of the description herein is directed to MPLS packets and protocol; these teachings are applicable to other protocols.

FIG. 6, from left to right, illustrates three different protocol packets 620, 630, and 640 being forwarded through a network to the network node 650 according to one embodiment.

The MPLS packet 620 is forwarded in the network, with the nexthop node to the network node performing penultimate hop popping (PHP) resulting in the shown MPLS packet 620 being delivered to the network node 650 on a physical interface.

The Segment Routing (SR) packet 630 is forwarded in the network, with the nexthop node to the network node performing penultimate segment popping (PSP) resulting in the shown Segment Routing packet 630 being delivered to the network node 650 on a physical interface. In one embodiment, the instantiation of the Segment Routing end function is associated with a corresponding SFV, with different instantiations of end functions (identified by different IP addresses) associated with different SFVs.

The Virtual Extensible LAN (VxLAN) packet 640 is forwarded in the network, resulting in the shown VxLAN packet 640 being delivered to the network node 640 on a physical interface.

In one embodiment for each of these received transport packets, the corresponding SRF is identified and used to identify (e.g., lookup operation in a forwarding/label data structure) the corresponding particular virtual interface (e.g., Service Function Instance). The decapsulated packet is communicated to the particular virtual instance. In one embodiment, the SRV and/or additional metadata (e.g., related to the particular protocol) is also made available to the particular virtual interface. The router performs processing operations according programming associated with the virtual interface.

In one embodiment, a same SFV (as well as multiple SFVs) in a same VRF is used by multiple different protocols.

In one embodiment, multiple physical ingress line cards (and/or packet processing entities thereon) implement a virtual interface corresponding to a Service Function Instance identified by the corresponding SFV. In one embodiment, independent processing is performed. However, one embodiment distributes/exchanges statistics or other values or otherwise provides access to this consolidated data to each of these virtual interfaces. For example, when packets related to a rate-limiting decision are received and processed by different instances of a same virtual interface (e.g., received on different line cards), these virtual interface instances need access to this complete information. One embodiment implements a virtual interface of a Service Function Interface/SFV in a single location within the network node, so packets are forwarded to this location for processing.

Network node 650 performs further processing, according to one embodiment, r performing the Service Function Instance processing in the particular virtual interface.

In one embodiment, the original packet and the SFV or another VRF identifying value is provided to another virtual or physical interface for generating a new transport packet (660, 670 or 680) to send from the network node. In one embodiment, other nodes in the network are configured to use a different VRF-identifying value (e.g., MPLS VPN or other label, Segment Identifier (SID), 802.1Q VLAN tag, VxLAN Network Identifier (VNID)). In one embodiment, the lookup operation in the VRF) identifies this value, and is communicated to the SFI virtual interface, and to the egress physical interface (and possibly an egress virtual interface if used to generate the transport packet).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving, by a network node, a transport packet, the transport packet including a service function value (SFV) and an original packet encapsulated by the transport packet;
determining a service function instance (SFI) defining a processing policy to be applied to the original packet and a particular Virtual Routing and Forwarding ("VRF") based on the SFV;
decapsulating the original packet from the transport packet;
processing the original packet according to the SFI;
after processing the original packet according to the SFI, performing a forwarding lookup operation in the VRF based on the processed original packet to identify specific forwarding information;
encapsulating the original packet, as processed according to the SFI, in a second transport packet, the second transport packet including forwarding information based on the specific forwarding information; and
sending the second transport packet from the network node.

2. The method of claim 1, wherein the transport packet comprises a segment routing packet, wherein the SFV identifies a segment routing end function corresponding to the SFI, and wherein processing the original packet according to the SFI comprises executing the segment routing end function.

3. The method of claim 1, wherein the transport packet comprises a multiprotocol label switching (MPLS) packet, and wherein the SFV comprises at least one of a transport label or a virtual private network (VPN) label.

4. The method of claim 1, wherein the transport packet comprises a Virtual Extensible LAN (VxLAN) packet, and wherein the SFV comprises a VxLAN virtual network identifier (VNI).

5. The method of claim 1, further comprising identifying a processing context based on the SFV.

6. The method of claim 5, wherein the processing context comprises a (VRF) instance.

7. The method of claim 1, further comprising:
receiving a second transport packet including a second SFV and a second original packet encapsulated by the second transport packet;
determining that the second SFV comprises a value corresponding to a particular VRF instance and a null value indicating that the second SFV does not identify any SFIs associated with the second original packet;
decapsulating the second original packet from the second transport packet; and
processing the second original packet without applying any SFIs associated with predetermined SFVs.

8. A system comprising:
one or more processors; and
at least one non-transitory computer-readable storage medium containing instructions which, when executed by the one or more processors, cause the one or more processors to perform operations comprising:
receive a transport packet including a service function value (SFV) and an original packet encapsulated by the transport packet;
determine a service function instance (SFI) defining a processing policy to be applied to the original packet and a particular Virtual Routing and Forwarding ("VRF") based on the SFV;
decapsulate the original packet from the transport packet;
process the original packet according to the SFI;
after processing the original packet according to the SFI, perform a forwarding lookup operation in the VRF based on the processed original packet to identify specific forwarding information;
encapsulate the original packet, as processed according to the SFI, in a second transport packet, the second transport packet including forwarding information based on the specific forwarding information; and
send the second transport packet from a network node.

9. The system of claim 8, wherein the transport packet comprises a segment routing packet, wherein the SFV identifies a segment routing end function corresponding to the SFI, and wherein processing the original packet according to the SFI comprises executing the segment routing end function.

10. The system of claim 8, wherein the transport packet comprises a multiprotocol label switching (MPLS) packet, and wherein the SFV comprises at least one of a transport label or a virtual private network (VPN) label.

11. The system of claim 8, wherein the transport packet comprises a Virtual Extensible LAN (VxLAN) packet, and wherein the SFV comprises a VxLAN virtual network identifier (VNI).

12. The system of claim 8, wherein the at least one non-transitory computer-readable storage medium contains instructions which, when executed by the one or more processors, cause the one or more processors to identify a processing context based on the SFV.

13. The system of claim 12, wherein the processing context comprises a (VRF) instance.

14. The system of claim 8, the operations further comprising:
receive a second transport packet including a second SFV and a second original packet encapsulated by the second transport packet;
determine that the second SFV comprises a value corresponding to a particular VRF instance and a null value indicating that the second SFV does not identify any SFIs associated with the second original packet;
decapsulate the second original packet from the second transport packet; and
process the second original packet without applying any SFIs associated with predetermined SFVs.

15. At least one non-transitory computer-readable medium containing instructions which, when executed by one or more processors, cause the one or more processors to perform operations comprising:
- receive a transport packet including a service function value (SFV) and an original packet encapsulated by the transport packet;
- determine a service function instance (SFI) defining a processing policy to be applied to the original packet and a particular Virtual Routing and Forwarding ("VRF") based on the SFV;
- decapsulate the original packet from the transport packet;
- process the original packet according to the SFI;
- after processing the original packet according to the SFI, perform a forwarding lookup operation in the VRF based on the processed original packet to identify specific forwarding information;
- encapsulate the original packet, as processed according to the SFI, in a second transport packet, the second transport packet including forwarding information based on the specific forwarding information; and
- send the second transport packet from the network node.

16. The at least one non-transitory computer-readable medium of claim 15, wherein the transport packet comprises a segment routing packet, wherein the SFV identifies a segment routing end function corresponding to the SFI, and wherein processing the original packet according to the SFI comprises executing the segment routing end function.

17. The at least one non-transitory computer-readable medium of claim 15, wherein the transport packet comprises a multiprotocol label switching (MPLS) packet, and wherein the SFV comprises at least one of a transport label or a virtual private network (VPN) label.

* * * * *